(12) United States Patent
Tsukamoto et al.

(10) Patent No.: US 10,682,668 B2
(45) Date of Patent: Jun. 16, 2020

(54) METHOD OF MANUFACTURING A HIGH-STRENGTH CARBON FIBER RESIN TAPE AND THE HIGH-STRENGTH CARBON FIBER RESIN TAPE

(71) Applicant: JAPAN MATEX CO., LTD., Sennan-shi (JP)

(72) Inventors: Katsuro Tsukamoto, Sennan (JP); Hiroaki Tsukamoto, Sennan (JP)

(73) Assignee: Japan Matex Co., Ltd., Sennan-shi (JP)

( * ) Notice: Subject to any disclaimer, the term of this patent is extended or adjusted under 35 U.S.C. 154(b) by 0 days.

(21) Appl. No.: 15/682,098

(22) Filed: Aug. 21, 2017

(65) Prior Publication Data

US 2018/0056325 A1   Mar. 1, 2018

(30) Foreign Application Priority Data

Aug. 25, 2016 (JP) .................................. 2016-165088
Aug. 2, 2017 (JP) .................................. 2017-150307

(51) Int. Cl.
| | |
|---|---|
| *B05D 1/18* | (2006.01) |
| *D01F 9/12* | (2006.01) |
| *B05D 3/14* | (2006.01) |
| *C09J 7/29* | (2018.01) |
| *C08K 3/22* | (2006.01) |

(52) U.S. Cl.
CPC .............. *B05D 1/18* (2013.01); *B05D 3/142* (2013.01); *C08K 3/22* (2013.01); *C09J 7/29* (2018.01); *D01F 9/12* (2013.01); *C09J 2205/106* (2013.01); *C09J 2400/10* (2013.01); *C09J 2400/263* (2013.01); *C09J 2429/006* (2013.01); *C09J 2433/006* (2013.01)

(58) Field of Classification Search
USPC ...................................................... 428/299.1
See application file for complete search history.

(56) References Cited

FOREIGN PATENT DOCUMENTS

| JP | 2014098127 A | 5/2014 |
|---|---|---|
| WO | WO 2016/068210 A1 | 5/2016 |

*Primary Examiner* — Lynda Salvatore
(74) *Attorney, Agent, or Firm* — Larry E. Henneman, Jr.; Henneman & Associates, PLC (57) ABSTRACT

The present invention provides a method of manufacturing a high-strength carbon fiber resin tape and the high-strength carbon fiber resin tape that can be widely applied for reinforcement of PVC pipe, PP pipe, or the like. The high-strength carbon fiber resin tape according to the present invention comprises a base material including a binder, metal oxide sol, and potassium persulfate between acrylic carbon fibers; an adhesive material having one or more physical characteristics of heat resistance, cold resistance, or high-strength applied on one surface of the base material; and an ultraviolet protection coating applied on the other surface of the base material.

20 Claims, 5 Drawing Sheets

METHOD OF MANUFACTURING A HIGH-STRENGTH CARBON FIBER RESIN TAPE AND THE HIGH-STRENGTH CARBON FIBER RESIN TAPE

CROSS-REFERENCE TO RELATED APPLICATIONS

This application claims foreign priority to Japanese Patent Application No. 2016-165088, filed on Aug. 25, 2016 by at least one common inventor, which is incorporated by reference herein in its entirety. This application also claims foreign priority to Japanese Patent Application No. 2017-150307, filed on Aug. 2, 2017 by at least one common inventor, which is also incorporated by reference herein in its entirety.

BACKGROUND OF THE INVENTION

Field of the Invention

The present invention relates to a method of manufacturing a high-strength carbon fiber resin tape and the high-strength carbon fiber resin tape. While carbon fiber resin includes two kinds of carbon fibers; acrylic carbon fiber resin and pitch-based carbon fiber, the present invention relates to a method of manufacturing a high-strength carbon fiber resin tape and the high-strength carbon fiber resin tape, wherein a carbon fiber resin tape consists of acrylic carbon fiber resin, and wherein the high-strength carbon fiber resin tape has an adhesive material having physical characteristics of one or more of heat resistance, cold resistance, or high-strength applied on its one surface, and an ultraviolet protection coating is applied on the other surface.

Description of Related Art

Forming a three-dimensional shape with a carbon fiber resin tape has been conventionally conducted by laminating several carbon fiber resin tapes, heating and pressurizing the laminate, and curing the resin impregnated in the carbon fiber. Then, heating and pressurizing the laminate in a mold with a three-dimensional shape produces a desired three-dimensional shape (see Japanese Unexamined Patent Application Publication No. 2014-98127).

Such heating and pressurization requires a mold and high temperature heating at 300° C. or more, leading to high cost.

In order to solve the problem, the inventors have suggested a method of manufacturing a carbon fiber resin tape, comprising a first step of immersing a carbon fiber bundle consisting of several carbon fibers in reduced water having a negative oxidation-reduction potential to flatly spread the carbon fiber bundle, a second step of immersing the carbon fiber bundle in an adhesive solution containing an adhesive material Alumina sol, and potassium persulfate after the first step, and a third step of drying the carbon fiber bundle after the second step (see WO2016/068210).

A carbon fiber tape obtained by compounding several carbon fibers and resins has strength and modulus of elasticity comparable to those of a metal material, while it has lower specific gravity than the metallic material. It allows for weight reduction of component members and causes less rusting, leading to increased use of the carbon fiber tape for airplanes and automobiles to reduce fuel consumption.

Finally, it is noted that the background information in this section may or may not be prior art with respect to the claims of the present application. Rather, the information is included solely to provide a brief overview of the technical environment of the present invention. Accordingly, inclusion of any information in this section is not an admission that the particular information is prior art.

SUMMARY OF THE INVENTION

In the light of the above, the inventors have carefully studied further high strengthening of the carbon fiber resin tape obtained by the manufacturing method in WO2016/068210 that can be applied for reinforcement of a pipe made of polyvinyl chloride (PVC pipe), a pipe made of polypropylene (PP pipe), an aluminium or iron pipe, lumbers such as a log or a square lumber, a parabolic antenna and a pipe antenna, for application to a lightning rod, for reinforcement of a high-strength hoses, sporting goods, bamboo materials, automobiles, and for reinforcement, repair, and maintenance of various plants. Accordingly, the present invention aims to provide a method of manufacturing a high-strength carbon fiber resin tape and the high-strength carbon fiber resin tape to be widely applied for reinforcement of a pipe made of polyvinyl chloride (PVC pipe), a pipe made of polypropylene (PP pipe), an aluminium or iron pipe, lumbers such as a log or a square lumber, a parabolic antenna and a pipe antenna, for application to a lightning rod, for reinforcement of a high-strength hoses, sporting goods, bamboo materials, automobiles, and for reinforcement, repair, and maintenance of various plants.

The invention according to a first aspect relates to a high-strength carbon fiber resin tape comprising a base material including a binder, metal oxide sol, and potassium persulfate between acrylic carbon fibers;

an adhesive material having one or more physical characteristics of heat resistance, cold resistance, or high-strength applied on one surface of the base material; and an ultraviolet protection coating applied on the other surface of the base material.

The invention according to a second aspect relates to the high-strength carbon fiber resin tape of the first aspect, wherein the metal oxide sol is one or more kinds of metal oxide sols selected from a group consisting of alumina, tin oxide, titanium oxide, tantalum oxide, niobium oxide, and zirconium oxide.

The invention according to a third aspect of the high-strength carbon fiber resin tape of the first aspect, wherein the metal oxide sol is metal oxide sol of the tin oxide.

The invention according to a fourth aspect relates to the high-strength carbon fiber resin tape of any one of first to third aspects, wherein the binder is polyvinyl alcohol (PVA).

The invention according to a fifth aspect relates to a method of manufacturing a high-strength carbon fiber resin tape, comprising (a) a first step of immersing a carbon fiber bundle having several carbon fibers in reduced water having a negative oxidation-reduction potential and flatly spreading the carbon fiber bundle to obtain spread carbon fiber bundle, (b) a second step of immersing the spread carbon fiber bundle in a binder solution containing the binder, metal oxide sol, and potassium persulfate, after the first step, (c) a third step of drying the above described spread carbon fiber bundle to obtain a base material of the carbon fiber resin tape, after the second step, and (d) a fourth step of applying an adhesive material having one or more physical characteristics of heat resistance, cold resistance, or high-strength applied on one surface of the base material of the carbon fiber resin tape obtained at the third step, and applying an ultraviolet protection coating on the other surface of the base material.

The invention according to a sixth aspect relates to the method of the fifth aspect, wherein the metal oxide sol is one or more kinds of metal oxide sols selected from a group consisting of alumina, tin oxide, titanium oxide, tantalum oxide, niobium oxide, and zirconium oxide.

The invention according to a seventh aspect relates to the method of the fifth aspect, wherein the metal oxide sol is metal oxide sol of the tin oxide.

The invention according to a seventh aspect relates to the method of any one of the fifth to eighth aspects, wherein the binder is polyvinyl alcohol (PVA).

The invention according to a ninth aspect relates to the method of any one of the fifth to eighth aspects, wherein the oxidation-reduction potential of the reduced water is −800 mV or less.

The invention according to a tenth aspect relates to the method of any one of the fifth to ninth aspects, wherein the second step further includes surface-treating the spread carbon fiber bundle by corona discharge, prior to immersing the spread carbon fiber bundle in the binder solution containing the binder, metal oxide sol, and potassium persulfate.

The invention according to an eleventh aspect relates to the method of any one of the fifth to tenth aspects, wherein the binder has a concentration of 0.5-30 wt %, the metal oxide sol has a concentration of 0.5-16.7 wt %, and the potassium persulfate has a concentration of 0.5-10 wt %, in the binder solution.

Effects of the Invention

According to the invention of the first aspect, the high-strength carbon fiber resin tape comprises a base material including a binder, metal oxide sol, and potassium persulfate between acrylic carbon fibers; an adhesive material having one or more physical characteristics of heat resistance, cold resistance, or high-strength applied on one surface of the base material; and an ultraviolet protection coating applied on the other surface of the base material. The high-strength carbon fiber resin tape can be widely applied for reinforcement of a pipe made of polyvinyl chloride (PVC pipe), a pipe made of polypropylene (PP pipe), an aluminium or iron pipe, lumbers such as a log or a square lumber, a parabolic antenna and a pipe antenna, for application to a lightning rod, for reinforcement of a high-strength hoses, sporting goods, bamboo materials, automobiles, and for reinforcement, repair, and maintenance of various plants. Specifically, the high-strength carbon fiber resin tape can be used under the severe environment such as under high temperature in the outdoors exposed to direct sunlight or under low temperature.

According to the invention of the second aspect, the metal oxide sol is one or more kinds of metal oxide sols selected from a group consisting of alumina, tin oxide, titanium oxide, tantalum oxide, niobium oxide, and zirconium oxide. It thus enables a high-strength carbon fiber resin tape having better peel strength and higher mechanical strength.

According to the invention of the third aspect, the metal oxide sol is metal oxide sol of the tin oxide, and the metal oxide sol of the tin oxide is compatible with a binder and potassium persulfate having an OH group. It thus enables a high-strength carbon fiber resin tape having better peel strength and higher mechanical strength.

According to the invention of the fourth aspect, the binder is polyvinyl alcohol (PVA) and thus can easily and stably bond the carbon fibers, which easily enables the high-strength carbon fiber resin tape according to the present invention.

According to the invention of the fifth aspect, a method of manufacturing a high-strength carbon fiber resin tape, comprises (a) a first step of immersing a carbon fiber bundle having several carbon fibers in reduced water having a negative oxidation-reduction potential and flatly spreading the carbon fiber bundle to obtain spread carbon fiber bundle, (b) a second step of immersing the spread carbon fiber bundle in a binder solution containing the binder, metal oxide sol, and potassium persulfate, after the first step, (c) a third step of drying the above described spread carbon fiber bundle to obtain a base material of the carbon fiber resin tape, after the second step, and (d) a fourth step of applying an adhesive material having one or more physical characteristics of heat resistance, cold resistance, or high-strength applied on one surface of the base material of the carbon fiber resin tape obtained at the third step, and applying an ultraviolet protection coating on the other surface of the base material. It thus enables the manufacture of a high-strength carbon fiber resin tape having further improved heat resistance, cold resistance, and weather resistance.

According to the invention of the sixth aspect, the metal oxide sol is one or more kinds of metal oxide sols selected from a group consisting of alumina, tin oxide, titanium oxide, tantalum oxide, niobium oxide, and zirconium oxide. It thus enables the manufacture of a high-strength carbon fiber resin tape having better peel strength and higher mechanical strength.

According to the invention of the seventh aspect, the metal oxide sol is metal oxide sol of the tin oxide, and the metal oxide sol of the tin oxide is compatible with a binder and potassium persulfate having an OH group. It thus enables the manufacture of a high-strength carbon fiber resin tape having better peel strength and higher mechanical strength.

According to the invention of the eighth aspect, the binder is polyvinyl alcohol (PVA) and thus can easily and stably bond the carbon fibers, which easily enables the manufacture of the high-strength carbon fiber resin tape according to the present invention.

According to the invention of the ninth aspect, the oxidation-reduction potential of the reduced water is −800 mV or less. It thus easily enables flat spreading of the carbon fiber bundle in the first step.

According to the invention of the tenth aspect, the second step further includes surface-treating the spread carbon fiber bundle by corona discharge, prior to immersing the spread carbon fiber bundle in the binder solution containing the binder, metal oxide sol, and potassium persulfate. It thus increases surface roughness of the spread carbon fiber bundle and causes the OH group contained in a catalyst to easily bond to the spread carbon fiber bundle. Accordingly, it easily enables applying of the adhesive material having one or more physical characteristics of heat resistance, cold resistance, or high-strength on one surface of the base material of the carbon fiber resin tape, and applying of the ultraviolet protection coating on other surface of the base material.

According to the invention of the eleventh aspect, the binder has a concentration of 0.5-30 wt %, the metal oxide sol has a concentration of 0.5-16.7 wt %, and the potassium persulfate has a concentration of 0.5-10 wt %, in the binder solution. It thus enables easy manufacturing of the high-strength carbon fiber resin tape which does not return to its original state even after a long time and has a higher mechanical strength.

DETAILED DESCRIPTION OF THE INVENTION

Embodiment 1

Hereinafter, preferable embodiments of the method of manufacturing the high-strength carbon fiber resin tape according to one embodiment of the present invention will be set forth, with reference to accompanying figures.

The method of manufacturing the high-strength carbon fiber resin tape of this embodiment comprises a first step of immersing a carbon fiber bundle having several carbon fibers in reduced water having a negative oxidation-reduction potential and flatly spreading the carbon fiber bundle to obtain spread carbon fiber bundle; a second step of immersing the spread carbon fiber bundle in a binder solution containing the binder, metal oxide sol, and potassium persulfate, after the first step; a third step of drying the above described spread carbon fiber bundle to obtain a base material of the carbon fiber resin tape, after the second step; and a fourth step of applying an adhesive material having one or more physical characteristics of heat resistance, cold resistance, or high-strength on one surface of the base material of the carbon fiber resin tape obtained at the third step, and applying an ultraviolet protection coating on other surface of the base material.

Figure 1:
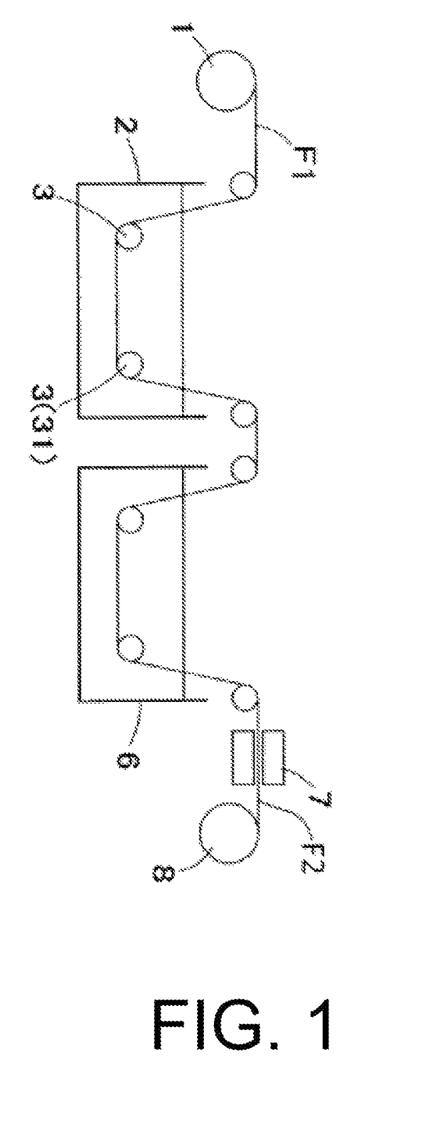
FIG. 1 is a schematic view of an apparatus for manufacturing a high-strength carbon fiber resin tape used for a method of manufacturing a high-strength carbon fiber resin tape according to the present invention.

FIG. 1 shows an apparatus for manufacturing a high-strength carbon fiber resin tape for use in a method of manufacturing the high-strength carbon fiber resin tape of the present invention. The apparatus for manufacturing the high-strength carbon fiber resin tape comprises a yarn feeding roller 1 feeding a carbon fiber bundle F1 and a winding roller 8 winding the base material of the formed high-strength carbon fiber resin tape F2 (also simply referred to as a "carbon fiber resin tape").

The apparatus for manufacturing the high-strength carbon fiber resin tape comprises a first tank 2 and a second tank 6 between the yarn feeding roller 1 and the winding roller 8 in which the carbon fiber bundle F1 is immersed in turn, and a drying apparatus 7 for drying the carbon fiber bundle F1 between the second tank 6 and the winding roller 8. The apparatus for manufacturing the high-strength carbon fiber resin tape also comprises a roller for delivering the carbon fiber bundle F1 between the yarn feeding roller 1 and the winding roller 8, as appropriate.

The first tank 2 stores reduced water having a negative oxidation-reduction potential. The second tank 6 stores a binder solution containing a binder, metal oxide sol, and potassium persulfate.

Hereinafter, each step of a method of manufacturing a high-strength carbon fiber resin tape of the present embodiment will be set forth.

<First Step>

As shown in FIG. 1, the carbon fiber bundle F1 is continuously fed from the yarn feeding roller 1 and then immersed in water stored in the first tank 2 for a predetermined period.

The carbon fiber bundle F1 includes, for example, 3K (three-thousand bundles), 6K (six-thousand bundles), 12K (twelve-thousand bundles) of non-twisted carbon fiber.

In this embodiment, an acrylic carbon fiber is applicable.

The water stored in the first tank 2 herein is reduced water having a negative oxidation-reduction potential. While general water has a positive oxidation-reduction potential (in the case of tap water: approximately +400 to +600 mV), reduced water has a negative oxidation-reduction potential, small water molecule cluster, and thus excellent permeability. The carbon fiber bundle F1 is immersed in such reduced water to naturally spread without the need of physical external force such as ultrasound or the like.

Reduced water used in the present invention has preferably −800 mV or less of oxidation-reduction potential. Using such reduced water having a low oxidation-reduction potential allows the carbon fiber F3 constituting the carbon fiber bundle F1 to surely and flatly spread in a short period of time and become a belt-like flat fiber bundle H. The obtained belt-like flat fiber bundle H is less likely to return to its original state.

A method for manufacturing reduced water used in the present invention includes, but not limited to, for example, following three methods:

[1. Gas Bubbling Method]

Bubbling nitrogen gas, argon gas, or hydrogen gas reduces an oxygen concentration in water and lowers an oxidation-reduction potential.

[2. Method by Addition of Hydrazine]

Addition of hydrazine reduces an oxygen concentration in water and lowers an oxidation-reduction potential.

[3. Electrolysis Method]

(a) Water electrolysis by application of high frequency voltage having asymmetrical positive and negative peak values and/or duty ratios decreases an oxidation-reduction potential.

(b) Prepare an electrode comprising one ground electrode (cathode) and two specially-shaped electrodes (rhombic mesh-like electrode or hexagonal mesh-like electrode) made of Pt and Ti with the anode and cathode alternately changed. Water electrolysis by application of high frequency voltage decreases an oxidation-reduction potential.

In the present invention, it is preferable to use reduced water obtained by the method "3(b)" among the three methods.

The reason is that the method "3(b)" more easily and surely gives reduced water which has a low oxidation-reduction potential (−800 mV or less) and maintains the negative oxidation-reduction potential for a long time, compared with the other methods.

An apparatus for implementing the method in "3(b)" is disclosed in Japanese Unexamined Patent Application Publication No. 2000-239456 by the applicant of this invention and able to be implemented based on this disclosure.

In the present invention, the carbon fiber bundle F1 can be naturally spread (expand) without any action of physical external force by being immersed in reduced water as described above. Also, a configuration as shown in FIG. 2 may be adopted to help this spreading action.

Figure 2:
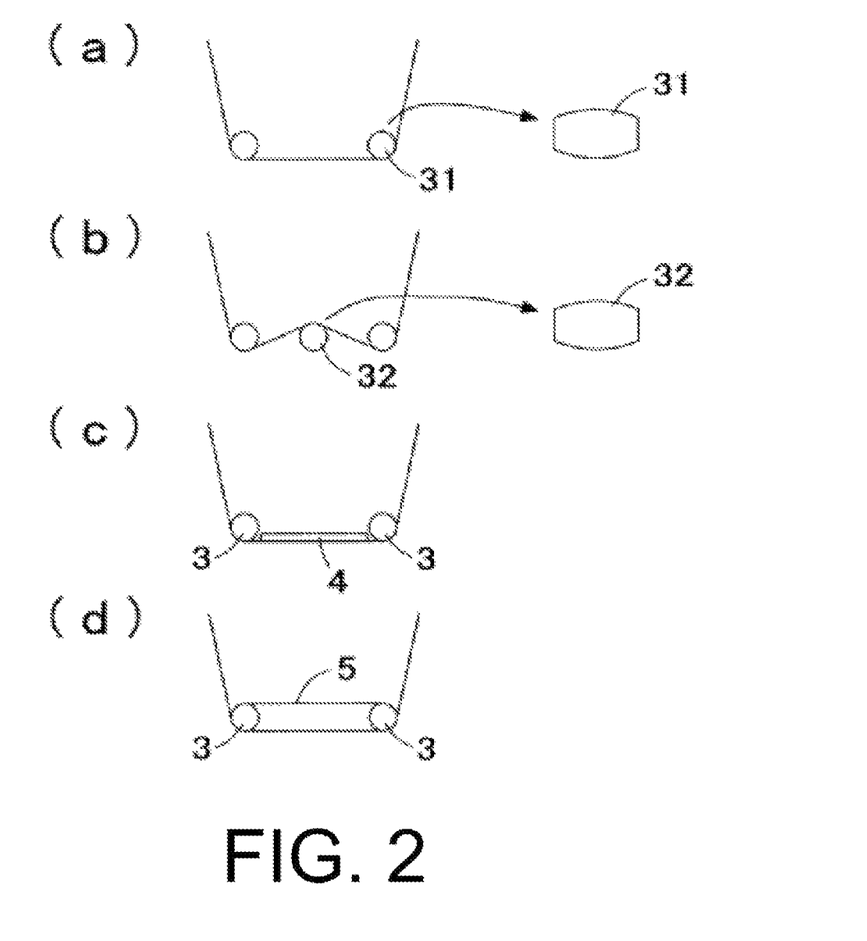
FIG. 2 shows an example of a configuration for supporting a spreading action.

FIG. 2 (a) shows a configuration wherein the second roller 31 of two conveyance rollers 3 which support and convey the carbon fiber bundle F1 in the first tank 2 has a spreading action.

Specifically, the cross-sectional (cross section along a rotation axis) shape of the second roller 31 is inflated from its both sides toward the center as shown by the arrow in FIG. 2 (a), allowing fibers to be easily spread along the surface of the second roller 31.

FIG. 2 (b) shows a configuration wherein three or more conveyance rollers 3 (three conveyance rollers in FIG. 2 (b)) are provided in the first tank 2 so as to convey the carbon fiber bundle F1 in a bended state, allowing the second and the following rollers (the second roller 32 in FIG. 2 (b)) to have a spreading action.

Specifically, the second roller 32 is made to have a cross-sectional shape similar to that in FIG. 2 (a), allowing fibers to be easily spread along the surface of the second roller 32.

FIG. 2 (c) shows a configuration wherein a flat plate 4 is provided between the conveyance rollers 3 which support and convey the carbon fiber bundle F1 in the first tank 2, and wherein the carbon fiber bundle F1 is conveyed along the surface of this flat plate 4 to make fibers easy to be flatly spread.

FIG. 2 (d) shows a configuration wherein a flat belt 5 is wound around the conveyance rollers 3 which support and convey the carbon fiber bundle F1 in the first tank 2, and wherein the carbon fiber bundle F1 is conveyed along the surface of this flat belt 5 to make fibers easy to be flatly spread.

[Second Step]

After the carbon fiber (flat fiber bundle H), which was immersed in reduced water in the first tank 2 and flatly spread, is taken out from the first tank 2, it is surface-treated (i.e., corona-treated) by corona discharge and then continuously introduced into the second tank 6.

This surface treatment by corona discharge is conducted with preferably 5 W·min/m$^2$-400 W·min/m$^2$, more preferably 50 W·min/m.

A binder solution containing a binder S, metal oxide sol M, and potassium persulfate B (or benzoyl) is stored in the second tank 6, and the flat fiber bundle H, which was obtained by immersing the carbon fiber bundle in reduced water, is immersed in the binder solution in the second tank 6.

The binder S has a hydrophilic group, and a water-soluble starch such as a laundry starch, PVA (polyvinyl alcohol), a PTFE (polytetrafluoroethylene) dispersion, a graphite nano dispersion, glycol, a water-soluble clay dispersion, a starch paste, an organic or inorganic material-containing dispersion solution having an OH group is suitably used as a binder.

If concentration of the binder S is lower than the predetermined range, the flatly spread carbon fiber bundle F1 may possibly return to its original state. In addition, if concentration of the binder S is higher than the predetermined range, the binder S may possibly become difficult to penetrate into the carbon fiber bundle F1.

When the binder S is PVA, 0.5-30 wt % of concentration is preferable.

Concentration of metal oxide sol M is preferably 0.5-16.7 wt %. If concentration of metal oxide sol M is lower than the lower limit, the adhesive strength of the high-strength carbon fiber resin tape may possibly decrease. In addition, the adhesive strength of the high-strength carbon fiber resin tape is less likely to increase even if concentration of metal oxide sol M is higher than the upper limit.

Also, concentration ratio of PVA to metal oxide sol M is preferably 3:1.

Further, concentration of potassium persulfate B is preferably 0.5-10 wt %.

Metal oxide sol M contained in a binder solution is one or more types of metal oxide sols selected from a group consisting of aluminium oxide (alumina), tin oxide, titanium oxide, tantalum oxide, niobium oxide, and zirconium oxide.

Such metal oxide sols contain a large number of OH groups. Using metal oxide sol containing a large number of OH groups for the binder solution increases the number of OH group contained in the binder solution and in turn, a chemical bonding strength (adhesive strength) by OH group. Thus, it is possible to easily adhere/bond rubber products in the range of 60° C. to 180° C., or carbon fibers and the other organic or inorganic substances in the range of 60° C. to 265° C. In addition, high mechanical strength and peel strength can be given to the carbon fiber resin tape.

Any metal oxide sol which contain a large number of OH groups, including, but not limited to, for example, lanthanum oxide, neodymium oxide, and cerium oxide can be used as a metal oxide sol M for use in the binder solution.

Moreover, a particle size and pH of the metal oxide sol M used for the binder solution may be not specifically limited and any particle size and pH which can be used for a binder solution may be preferable.

Alumina of alumina sol may have any shape such as plate-like, columnar, fibrous, and hexagonal plate-like shapes.

Also, an alumina fiber having fibrous alumina sol is a fibrous crystal of alumina, and specifically, it includes an alumina fiber formed with an anhydrate of alumina, a hydrated alumina fiber formed with a hydrate-containing alumina, and the like.

A crystal system of the alumina fiber may include any of an amorphous, boehmite, and pseudo-boehmite crystal systems, etc. Boehmite is a crystal of the hydrated alumina denoted by a compositional formula: $Al_2O_3 \cdot nH_2O$. The crystal system of the alumina fiber can be adjusted according to, for example, a class of a hydrolyzable aluminum compound, its hydrolysis condition, or peptization condition, any of which will be described later. The crystal system of the alumina fiber can be identified using an X-ray diffractometer (for example, a product name "Mac. Sci. MXP-18", MAC Science Co., Ltd.).

In addition, the metal oxide contained in the metal oxide sol other than alumina sol may have, but not specifically limited to, any shape such as plate-like, columnar, fibrous, and hexagonal plate-like shapes.

Moreover, if the metal oxide sol other than alumina sol is fibrous, the metal oxide is a fibrous crystal thereof. More specifically, the fibrous crystal includes a metal oxide fiber formed with an anhydrate of the metal oxide, a hydrated metal oxide fiber formed with a hydrate-containing metal oxide, and the like.

A metal oxide sol M used for a binder solution (metal oxide sol, such as alumina, tin oxide, titanium oxide, tantalum oxide, niobium oxide, or zirconium oxide) includes, but not limited to, for example, alumina sol-10A (wt. % of $Al_2O_3$: 9.8-10.2, particle size (nm): 5-15, viscosity mPa/s (25° C.): <50, pH: 3.4-4.2, manufactured by Kawaken Fine Chemicals Co., Ltd.), alumina sol-A2 (wt. % of $Al_2O_3$: 9.8-10.2, particle size (nm):10-20, viscosity mPa/s (25° C.): <200, pH: 3.4-4.2, manufactured by Kawaken Fine Chemicals Co., Ltd.), alumina sol-CSA-110AD (wt. % of $Al_2O_3$: 6.0-6.4, particle size (nm): 5-15, viscosity mPa/s (25° C.): <50, pH: 3.8-4.5, manufactured by Kawaken Fine Chemicals Co., Ltd.), alumina sol-F1000 (wt. % of $Al_2O_3$: 4.8-5.2, particle size (nm): 1400, viscosity mPa/s (25° C.): <1000, pH: 2.9-3.3, manufactured by Kawaken Fine Chemicals Co., Ltd.), alumina sol-F3000 (wt. % of $Al_2O_3$: 4.8-5.2, particle size (nm): 2000-4500, viscosity mPa/s (25° C.): <1000, pH: 2.7-3.3, manufactured by Kawaken Fine Chemicals Co., Ltd.), Tainoc A-6 (wt. % of $TiO_2$: 6, average particle size: 20 nm, pH: 12, manufactured by Taki Chemical Co., Ltd.), Tainoc AM-15 (wt. % of $TiO_2$: 15, average particle size: 20 nm, pH: 4, manufactured by Taki Chemical Co., Ltd.), Biral Zr—C20 (wt. % of $ZrO_2$: 20, average particle size: 40 nm, pH: 8, manufactured by Taki Chemical Co., Ltd.), Biral La—C10 (wt. % of $La_2O_3$: 10, average particle size: 40 nm, pH: 8, manufactured by Taki Chemical Co., Ltd.), Biral Nd—C10 (wt. % of $Nd_2O_3$: 10, average particle size: 20 nm, pH: 9, the manufactured by Taki Chemical Co., Ltd.), Needlal B-10 (wt. % of CeO2: 10, average particle size: 20 nm, pH: 8, manufactured by Taki Chemical Co., Ltd.), Ceramace S-8 (wt. % of $SnO_2$: 8, average particle size: 8 nm, pH: 10, manufactured by Taki Chemical Co., Ltd.), Biral Nb-G6000 (wt. % of $Nb2O_3$: 6, average particle size: 15 nm, pH: 8, manufactured by Taki Chemical Co., Ltd.), and the like. Any metal oxide sols known to those skilled in the art containing a large number of OH groups, such as tin oxide, titanium oxide, tantalum oxide, niobium oxide, or zirconium oxide can be used.

It is desirable to use a polyvinyl alcohol (PVA) resin (also simply referred to as a "PVA") which is a thermoplastic resin, as a binder component (a binder) for a binder solution.

The PVA resin has a structural formula shown below and contains many OH groups. Therefore, the PVA resin is characterized by very strong hydrophilicity and solubility to warm water, and thus can adhere/bond rubber products in the range of 60° C. to 180° C. and carbon fiber resins, etc. in the range of 60° C. to 265° C.

Also, since the PVA resin is a thermoplastic resin, it is softened by heating or warming the adhered/bonded carbon fiber resins, etc. again, allowing for easy peeling of the adhered/bonded carbon fiber resins, etc.

In addition, the PVA resin stably exists in the binder even after blended into the binder solution, and thus its adhesive/bonding strength is less likely to decline. Thus, the binder solution containing the PVA resin can be stably used for a long time.

Using the thermoplastic PVA resin containing OH groups for a binder solution eliminates the need for conventionally heating the carbon fiber resins, etc. at high temperature in the adhesion/bonding, enables easy adhesion/bonding of rubber products, carbon fibers, and the other organic or inorganic substances, and also enables easy peeling of the adhered substances as they are not physically adhered/bonded (i.e., they are not adhered/bonded by fitting based on structures or shapes of adhering substances and adhered substances or by thermal stress).

[Formula 1]

Accordingly, as the flat fiber bundle H is immersed in the binder solution containing binder S, metal oxide sol M, and potassium persulfate B, the binder solution penetrates between the spread fibers.

Figure 3:
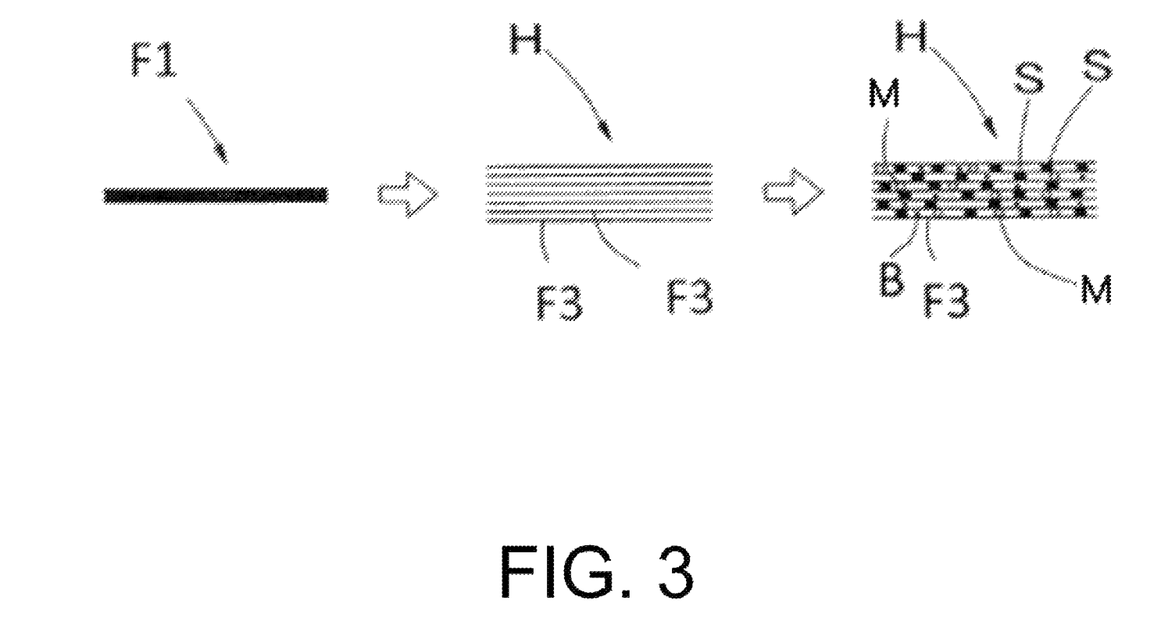
FIG. 3 schematically shows transition of the forms of the carbon fiber bundle in the manufacturing method of the present invention.

FIG. 3 schematically shows the preceding steps. The carbon fiber bundle F1 consisting of several carbon fibers F3 is immersed in reduced water to become a flat fiber bundle H in which the carbon fibers F3 are flatly spread. And as this flat fiber bundle H is immersed in a solution containing a binder S, metal oxide sol M, and potassium persulfate B, the binder S, metal oxide sol M, and potassium persulfate B penetrate between the carbon fibers F3.

In the present invention, the above-mentioned reduced water may be used as a solvent to dissolve a binder, thereby increasing penetrance of the binder.

Additionally, in the present invention, a method of spraying the flattened carbon fiber (flat fiber bundle H) obtained by immersing the carbon fiber bundle in reduced water with a solution containing a binder S, metal oxide sol M, and potassium persulfate B without providing the second tank 6 may be adopted.

[Third Step]

The flat fiber bundle H flatly-spread after immersed in a binder solution containing a binder S, metal oxide sol M, and potassium persulfate B is taken out from the second tank 6, then supplied to the drying apparatus 7 and dried to give a base material of the carbon fiber resin tape F2 (also simply referred to as a "carbon fiber resin tape").

A type of the drying apparatus 7 may be, but not particularly limited to, a heater heating device, a warm air heating device, and a heating device utilizing far-infrared rays. However, in the method according to the present invention, it is not necessarily required to provide the drying apparatus 7 and the flat fiber bundle H may be naturally dried.

In addition, after this third step, the base material of the carbon fiber resin tape F2 may be further rinsed with water to remove excessive binders and dried. Accordingly, excessive impurities are removed and necessary OH groups are left, thereby improving peel strength.

After the immersion, the flat fiber bundle H is dried to solidify the binder S, metal oxide sol M, and potassium persulfate B which have penetrated between the spread fibers.

Solidifying the fibers in a flatly-spread state with a binder S provides a base material of the carbon fiber resin tape F2 which does not return to its original state even after a certain period of time and has a high mechanical strength.

After the binder S, metal oxide sol M, and potassium persulfate B are solidified in the drying apparatus 7, the base material of the carbon fiber resin tape F2 is wound by the winding roller 8.

In addition, the carbon fiber resin tape F2, obtained by the third step, which is not applied with an adhesive material A and an ultraviolet protection coating P as mentioned later, means a base material of the carbon fiber resin tape F2 in the present invention.

[Fourth Step]

An adhesive material A having one or more kinds of physical characteristics of heat resistance, cold resistance, or high strength is applied on one surface of the base material of the carbon fiber resin tape F2 obtained by the above-mentioned third step. For example, a polyurethane binder, epoxy resin binder, silicone rubber binder, polytetrafluoroethylene (PTFE) binder, etc. may be used as such adhesive material A. Subsequently, ultraviolet protection coating P is applied on the other surface, dried, and then wound by the roller to consequently give a high-strength carbon fiber resin tape F4. For example, a silicone resin coating, an acrylate resin coating, a urethane resin coating, a fluororesin coating, etc. may be used as the ultraviolet protection coating P. The structure of the high-strength carbon fiber resin tape F4 is as shown in FIG. 4.

Figure 5:
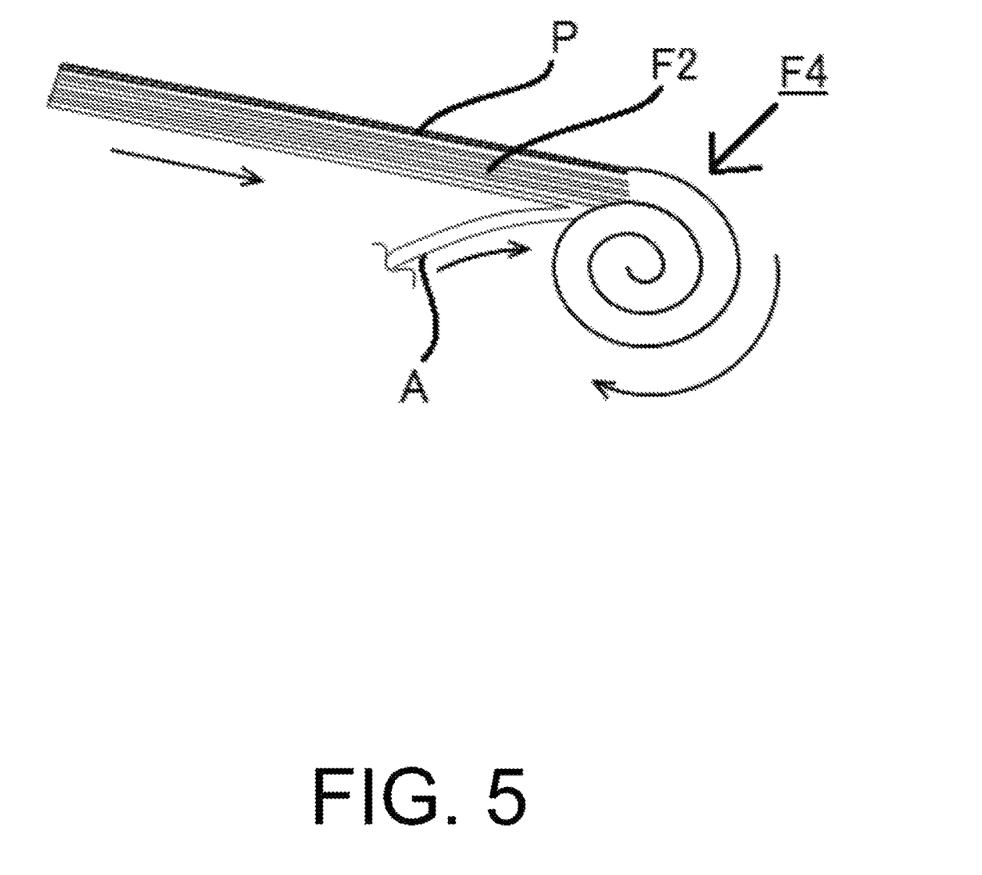
FIG. 5 is an explanatory view showing the manufacturing step of the high-strength carbon fiber resin tape according to the present invention.

FIG. 5 is a diagram illustrating the step of manufacturing high-strength carbon fiber resin tape F4 of the present invention. As shown in FIG. 5, the high-strength carbon fiber resin tape F4 of the invention is manufactured by applying an adhesive material having one or more physical characteristics of heat resistance, cold resistance or high-strength on one surface of the base material of the carbon fiber resin tape F2, applying an ultraviolet protection coating P on the other surface, as well as winding the base material of the carbon fiber resin tape F2 in the arrow direction of FIG. 5. The method shown in FIG. 5 is just an example, and the method of manufacturing high-strength carbon fiber resin tape F4 of the invention is not limited to this.

In particular, from the point of workability and handleability, a double-sided adhesive tape is preferably used as an adhesive material A. Using the double-sided adhesive tape as an adhesive material A provides better convenience. The double-sided adhesive tape includes, but not limited to, acrylic double-sided tape manufactured by SEKISUI CHEMICAL CO., LTD., double sided tape for adhesion to silicone rubber No. 5302A manufactured by Nitto Denko Corporation, and the like.

Figure 4:
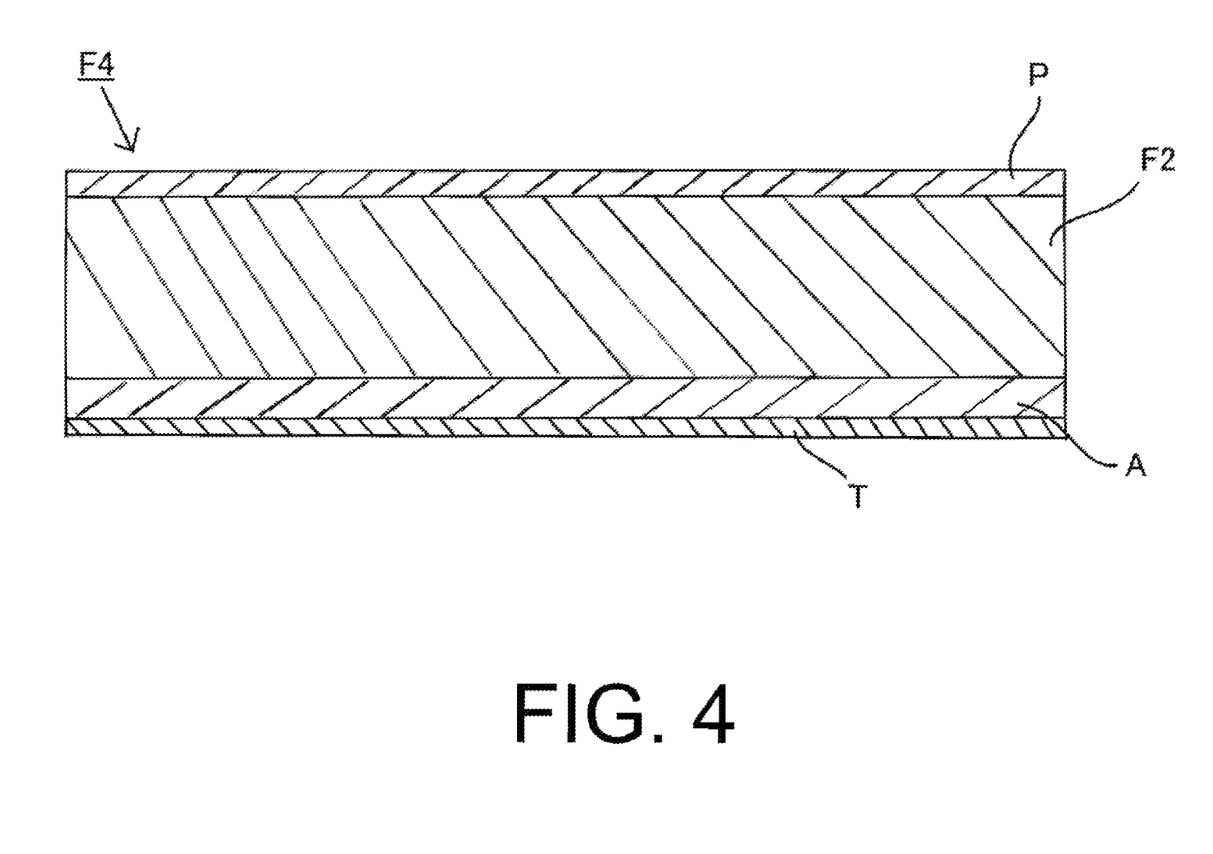
FIG. 4 is a cross-sectional explanatory view showing an example of a configuration of the high-strength carbon fiber resin tape according to the embodiment of the present invention.

As shown in FIG. 4, when the double-sided adhesive tape is used as an adhesive material A, a release paper tape T may be provided to the outer surface of the tape.

As described above, according to the method of the present invention, the belt-like high-strength carbon fiber resin tape F4 can be manufactured by spreading the fibers flatly, without applying a physical outside force. However, applying a physical outside force is not completely excluded by the invention, and the method of the present invention may be used in combination with a conventional method for applying a physical outside force.

For example, it is also possible to adopt a method for applying ultrasonic waves to the carbon fiber bundle F1 immersed in reduced water by an installed ultrasonic generator in the first tank 2. In this case, the sufficient spread is achieved by the spread action of the reduced water even if the output of the ultrasonic waves is weakened, thereby providing an effect that the fully spread, belt-like flat fiber bundle H can be manufactured efficiently while securely preventing damage to the fiber.

Embodiment 2

The high-strength carbon fiber resin tape F4 of the other embodiment of the present invention is described below in detail with reference to the accompanying figures.

As shown in FIG. 4, the high-strength carbon fiber resin tape F4 of the embodiment comprises a base material F2 including binder S, metal oxide sol M and potassium persulfate B between acrylic carbon fibers F3; an adhesive material A having one or more physical characteristics of heat resistance, cold resistance or high strength applied on one surface of the base material; and an ultraviolet protection coating P applied on the other surface of the base material F2.

As an ultraviolet protection coating P, the coating corresponding to type 1, type 2 and type 3 of JIS (Japanese Industrial Standards) A6909 is preferable. Specifically, it may be preferable to adopt, for example, the special coating No. 82 and No. 86 manufactured by ThreeBond Co., the silicon coating manufactured by Asahipen Corporation, and the like.

The high-strength carbon fiber resin tape F4 manufactured by the embodiment 1 can be firmly adhered to any other object by a binder. The several high-strength carbon-fiber resin tapes F4 can be laminated with or without the binder into a three-dimensional shape. Thus, the tape needs not to be pressed at high pressure when it is adhered or laminated. Even if the tape is heated, a high adhesive strength is achieved by heating at 100° C. or below.

This is because the OH group of binder S, metal oxide sol M and potassium persulfate B adhered between the carbon fibers F3 contributes to the high adhesive strength of the high-strength carbon fiber resin tape F4.

According to the embodiment, the high-strength carbon fiber resin tape F4 has a configuration wherein an adhesive material A having one or more physical characteristics of heat resistance, cold resistance or high-strength is applied on one surface of base material of carbon fiber resin tape F2 consisting of acrylic carbon fiber resin, and wherein an ultraviolet protection coating P is applied on the other surface of base material of the carbon fiber resin tape F2. Thus, the high-strength carbon fiber resin tape can be achieved which can be widely applied for reinforcement of a pipe made of polyvinyl chloride (PVC pipe), a pipe made of polypropylene (PP pipe), an aluminium or iron pipe, lumbers such as a log or a square lumber, a parabolic antenna and a pipe antenna, for application to a lightning rod, for reinforcement of a high-strength hoses, sporting goods, bamboo materials, automobiles, and for reinforcement, repair, and maintenance of various plants. Specifically, the high-strength carbon fiber resin tape can be used under the severe environment such as under high temperature in the outdoors exposed to direct sunlight or under low temperature.

As shown in FIG. 5, the high-strength carbon fiber resin tape F4 of the embodiment has a sandwich structure with the base material of carbon fiber tape F2 being sandwiched between a layer of ultraviolet protection coating P and a layer of adhesive material A having one or more physical characteristics of heat resistance, cold resistance or high strength. As an alternative example of the embodiment, the invention also includes a sandwich structure where the layer of ultraviolet protection coating P is sandwiched between the base material of the tape F2 and the layer of adhesive material A having one or more physical characteristics of heat resistance, cold resistance or high strength.

EXAMPLES

A peel strength test of the high-strength carbon fiber resin tape of the invention was performed.

The high-strength carbon fiber resin tape of Examples 1-6 used in the test was manufactured in the above first to fourth steps, and cut into 150 mm×20 mm.

The corona treatment in the above second step was performed in 50 W·min/m$^2$.

As follows, the type of metal oxide sols used in a binder solution was changed, and each type was used as Examples 1-6.

The concentration of each component of the binder used in Examples 1-6 is as follows.

PVA: 5 wt %
Metal oxide sol: 1 wt %
Potassium persulfate: 1 wt %
Water: 93 wt %

Example 1

Metal oxide sol: Alumina (alumina sol-10A (wt. % of $Al_2O_3$: 9.8-10.2, particle size (nm): 5-15, viscosity mPa/s (25° C.): <50, pH: 3.4-4.2, manufactured by Kawaken Fine Chemicals Co., Ltd.))

Example 2

Metal oxide sol: tin oxide (CERAMACE S-8 (wt. % of $SnO_2$: 8, Average particle diameter (nm): 8, PH: 10, manufactured by Taki Chemical Co., Ltd.))

Example 3

Metal oxide sol: zirconium oxide (BIRAL Zr—C20 (wt. % of $ZrO_2$: 20, Average particle diameter (nm): 40, PH: 8, manufactured by Taki Chemical Co., Ltd.))

Example 4

Metal oxide sol: titanium oxide (TYNOC A-6 (wt. % of $TiO_2$: 6, Average particle diameter (nm): 20, PH: 12, manufactured by Taki Chemical Co., Ltd.))

Example 5

Metal oxide sol: titanium oxide (TYNOC AM-15 (wt. % of $TiO_2$: 15, Average particle diameter (nm): 20, PH: 4, manufactured by Taki Chemical Co., Ltd.))

Example 6

Metal oxide sol: niobium oxide (BIRAL Nb-G6000 (wt. % of $Nb_2O_3$: 6, Average particle diameter (nm): 15, PH: 8, manufactured by Taki Chemical Co., Ltd.))

Comparative Example 1

Without performing the above second step (the step of immersing the spread carbon fiber bundle in a binder solution) and the corona treatment, the carbon fiber resin tape manufactured in the first, third and fourth steps was used as Comparative example 1. Comparative example 1 cut into 150 mm×20 mm was used in a peel test.

To Examples 1-6 and Comparative example 1 manufactured by the above procedures were applied a binder (manufactured by Konishi Co., Ltd., ultra-multipurpose (Registered trademark)) diluted to 5 wt % with acetone. A stainless plate (SUS plate) was adhered to Examples 1-6 and Comparative example 1, and completely cured for 4 hours in drying furnace at 60° C.

Three samples (N=1-3) were prepared in each of Examples and Comparative example.

A 90-degree peel test was carried out based on JIS K 6854-1 (ISO 8510-1).

Each of peak point test force, maximum point test force, and average test force were confirmed in the peel test.

The test results are shown in Tables 1-3.

TABLE 1

Peak point test force (Unit: N)

| N | Example 1 | Example 2 | Example 3 | Example 4 | Example 5 | Example 6 | Comparative Example 1 |
|---|---|---|---|---|---|---|---|
| 1 | 2.24585 | 4.51251 | 1.51523 | 6.69390 | 4.51694 | 1.67877 | 0.80752 |
| 2 | 1.85051 | 7.13934 | 1.90926 | 4.29684 | 7.22436 | 1.69112 | 2.17548 |
| 3 | 2.35950 | 4.16721 | 2.19742 | 3.39497 | 2.83008 | 1.81519 | 2.15611 |
| Average | 2.15195 | 5.27302 | 1.87397 | 4.79524 | 4.85713 | 1.72836 | 1.71304 |

TABLE 2

Maximum point test force (Unit: N)

| N | Example 1 | Example 2 | Example 3 | Example 4 | Example 5 | Example 6 | Comparative Example 1 |
|---|---|---|---|---|---|---|---|
| 1 | 4.16211 | 7.98552 | 2.47319 | 5.46488 | 5.54179 | 3.91607 | 2.19001 |
| 2 | 2.62862 | 8.16475 | 2.82386 | 6.36178 | 4.92540 | 3.44732 | 1.36910 |
| 3 | 2.76504 | 8.87689 | 3.73658 | 4.73247 | 6.72254 | 3.62817 | 2.61343 |
| Average | 3.18526 | 8.34239 | 3.01121 | 5.51971 | 5.72991 | 3.66385 | 2.05751 |

TABLE 3

Average test force (Unit: N)

| N | Example 1 | Example 2 | Example 3 | Example 4 | Example 5 | Example 6 | Comparative Example 1 |
|---|---|---|---|---|---|---|---|
| 1 | 3.13299 | 6.20456 | 1.80031 | 3.65900 | 4.77963 | 2.24944 | 1.77540 |
| 2 | 1.99816 | 6.66692 | 2.17666 | 4.09352 | 4.88706 | 2.00637 | 0.50365 |
| 3 | 1.60482 | 6.49577 | 2.14353 | 3.19752 | 3.27483 | 1.76768 | 2.06033 |
| Average | 2.24532 | 6.45575 | 2.04017 | 3.65001 | 4.31384 | 2.00783 | 1.44646 |

In the peak point test force of Table 1, Example 1, 3 and 6 were found to have low peel strength value, but stable peel strength because the variation in peel strength values of each sample (N=1-3) was small.

Example 2, 4 and 5 were found to have wide variation in peel strength value of each sample (N=1-3), but high peel strength on average.

In the maximum point test force of Table 2, Example 2 had small variation in peel strength values of each sample (N=1-3) and high peel strength value.

Example 6 had small value, but has small variation in peel strength values of each sample (N=1-3), and thus stable peel strength.

In the average test force of Table 3, Example 2 has small variation in peel strength values of each sample (N=1-3) and high peel strength value.

From the results of the peel strength test shown in Tables 1-3, it was found that the peel strength of carbon fiber resin tape is changed by changing the type of metal oxide sol used in a binder solution.

It was found that using tin oxide as metal oxide sol can achieve the test force two or three times greater than that achieved in using alumina, zirconium oxide and niobium oxide as metal oxide sol.

In addition, Examples 1-6 were found to have better peel strength than comparative example 1 in all tests (peak point test force, maximum point test force and average test force).

Therefore, the second step of immersing a spread carbon fiber in the binder and the corona treatment were found to give superior peel strength to the carbon fiber resin tape.

Among Examples 1-6, Example 2 had the highest value in all test forces. Since high test force generally shows the improvement of adhesiveness, Example 2 was found to be the best from the viewpoint of adhesiveness.

These results showed that the high strength carbon fiber resin tape of the invention has superior peel strength.

Example 7

A high-strength carbon fiber resin tape was provided by applying the tape manufactured by 3M company (3M Japan Limited) (trade name_9495B and 4597) on one surface of base material of carbon fiber resin tape, and applying the tape manufactured by 3M company (3M Japan Limited) (trade name_Y4924) on the other surface.

The test of exposing this tape to sunlight has been continued, but a person skilled in the art will consider that the bending resistance of the high-strength carbon fiber resin tape itself is not changed even if the tape is exposed to sunlight for a long time (about one year).

Comparative Example 2

The test of exposing the carbon fiber resin tape to sunlight has been continued without applying the tape of Example 7 to both surface of the carbon fiber resin tape, but a person skilled in the art will consider that the bending resistance of the high-strength carbon fiber resin tape itself deteriorates if the tape is exposed to sunlight for a long time (about one year).

INDUSTRIAL APPLICABILITY

According to the high-strength carbon fiber resin tape of the first aspect, the high-strength carbon fiber resin tape comprises a base material including binder, metal oxide sol and potassium persulfate between acrylic carbon fibers; an adhesive material having one or more physical characteristics of heat resistance, cold resistance or high strength applied on one surface of the base material; and an ultraviolet protection coating applied on the other surface of the base material. Thus, the high-strength carbon fiber resin tape can be achieved, which can be widely applied for reinforcement of a pipe made of polyvinyl chloride (PVC pipe), a pipe made of polypropylene (PP pipe), an aluminium or iron pipe, lumbers such as a log or a square lumber, a parabolic antenna and a pipe antenna, for application to a lightning rod, for reinforcement of a high-strength hoses, sporting goods, bamboo materials, automobiles, and for reinforcement, repair, and maintenance of various plants. Specifically, the high-strength carbon fiber resin tape can be used under the severe environment such as under high temperature in the outdoors exposed to direct sunlight or under low temperature.

According to the method of the fifth aspect, the method comprises (a) a first step of immersing a carbon fiber bundle having several carbon fibers in reduced water having negative oxidation-reduction potential and flatly spreading the bundle to obtain spread carbon fiber bundle; (b) a second step of immersing the spread carbon fiber bundle in a binder solution comprising binder, metal oxide sol and potassium persulfate, after the first step; (c) a third step of drying the spread carbon fiber bundle to obtain a base material of the carbon fiber resin tape, after the second step; (d) a fourth step of applying an adhesive material having one or more physical characteristics of heat resistance, cold resistance or high strength (effective use of double sided adhesive tape provides better convenience) on one surface of the base material of the carbon fiber resin tape obtained in the third step, and applying an ultraviolet protection coating on the other surface. It thus enables a carbon fiber resin tape having further improved heat resistance, cold resistance and weather resistance.

DESCRIPTION OF SYMBOLS

F1 Carbon fiber bundle
F2 Carbon fiber resin tape (base material of carbon fiber resin tape)
F4 High strength carbon fiber resin tape
A Adhesive material
B Potassium persulfate
M Metal oxide sol
S Binder
P Ultraviolet protection coating
T Release paper tape

The invention claimed is:

1. A high-strength carbon fiber resin tape, comprising:
a base material including a binder mixture of a binder, metal oxide sol, and potassium persulfate between acrylic carbon fibers;
an adhesive material different from said binder and having one or more physical characteristics of heat resistance, cold resistance, or high-strength applied on one surface of the base material; and
an ultraviolet protection coating applied on the other surface of the base material.

2. The high-strength carbon fiber resin tape according to claim 1, wherein said metal oxide sol is one or more kinds of metal oxide sols selected from a group consisting of alumina, tin oxide, titanium oxide, tantalum oxide, niobium oxide, and zirconium oxide.

3. The high-strength carbon fiber resin tape according to claim 2, wherein said binder is polyvinyl alcohol (PVA).

4. The high-strength carbon fiber resin tape according to claim 1, wherein said metal oxide sol is metal oxide sol of the tin oxide.

5. The high-strength carbon fiber resin tape according to claim 4, wherein said binder is polyvinyl alcohol (PVA).

6. The high-strength carbon fiber resin tape according to claim 1, wherein said binder is polyvinyl alcohol (PVA).

7. A method of manufacturing a high-strength carbon fiber resin tape, said method comprising:
(a) a first step of immersing a carbon fiber bundle having several acrylic carbon fibers in reduced water having a negative oxidation-reduction potential and flatly spreading the carbon fiber bundle to obtain a spread carbon fiber bundle;
(b) a second step of immersing said spread carbon fiber bundle in a binder solution containing the binder, metal oxide sol, and potassium persulfate, after said first step;
(c) a third step of drying said spread carbon fiber bundle to obtain a base material of the carbon fiber resin tape, after said second step; and (d) a fourth step of applying an adhesive material having one or more physical characteristics of heat resistance, cold resistance, or high-strength on one surface of the base material of said carbon fiber resin tape obtained at said third step, and applying an ultraviolet protection coating on the other surface of the base material; thereby forming a high-strength carbon fiber resin tape including said base material including a binder mixture of said binder, said metal oxide sol, and said potassium persulfate between said acrylic carbon fibers;

said adhesive material different from said binder and having one or more physical characteristics of heat resistance, cold resistance, or high-strength applied on one surface of said base material; and said ultraviolet protection coating applied on the other surface of said base material.

8. The method according to claim 7, wherein said metal oxide sol is one or more kinds of metal oxide sols selected from a group consisting of alumina, tin oxide, titanium oxide, tantalum oxide, niobium oxide, and zirconium oxide.

9. The method according to claim 8, wherein said binder is polyvinyl alcohol (PVA).

10. The method according to claim 9, wherein the second step further includes surface-treating said spread carbon fiber bundle by corona discharge, prior to immersing said spread carbon fiber bundle in the binder solution containing the binder, metal oxide sol, and potassium persulfate.

11. The method according to claim 8, wherein the second step further includes surface-treating said spread carbon fiber bundle by corona discharge, prior to immersing said spread carbon fiber bundle in the binder solution containing the binder, metal oxide sol, and potassium persulfate.

12. The method according to claim 7, wherein said metal oxide sol is metal oxide sol of the tin oxide.

13. The method according to claim 12, wherein said binder is polyvinyl alcohol (PVA).

14. The method according to claim 13, wherein the second step further includes surface-treating said spread carbon fiber bundle by corona discharge, prior to immersing said spread carbon fiber bundle in the binder solution containing the binder, metal oxide sol, and potassium persulfate.

15. The method according to claim 12, wherein the second step further includes surface-treating said spread carbon fiber bundle by corona discharge, prior to immersing said spread carbon fiber bundle in the binder solution containing the binder, metal oxide sol, and potassium persulfate.

16. The method according to claim 7, wherein said binder is polyvinyl alcohol (PVA).

17. The method according to claim 16, wherein the second step further includes surface-treating said spread carbon fiber bundle by corona discharge, prior to immersing said spread carbon fiber bundle in the binder solution containing the binder, metal oxide sol, and potassium persulfate.

18. The method according to claim 7, wherein the second step further includes surface-treating said spread carbon fiber bundle by corona discharge, prior to immersing said spread carbon fiber bundle in the binder solution containing the binder, metal oxide sol, and potassium persulfate.

19. The method according to claim 7, wherein the oxidation-reduction potential of said reduced water is −800 mV or less.

20. The method according to claim 7, wherein the binder has a concentration of 0.5-30 wt %, the metal oxide sol has a concentration of 0.5-16.7 wt %, and the potassium persulfate has a concentration of 0.5-10 wt %, in said binder solution.

* * * * *